United States Patent [19]

Ruskin

[11] Patent Number: 5,310,438
[45] Date of Patent: May 10, 1994

[54] PROCESS FOR MAKING LOW COST DRIP IRRIGATION LINES USING PLASTIC EXTRUSION AND FILM BLOWING TECHNIQUES

[75] Inventor: Rodney R. Ruskin, San Francisco, Calif.

[73] Assignee: Agrifim Irrigation International N.V., Netherlands Antilles

[21] Appl. No.: 991,826

[22] Filed: Dec. 16, 1992

[51] Int. Cl.$^5$ .............................................. B29C 47/02
[52] U.S. Cl. .............................. 156/243; 156/244.12; 156/244.13; 156/244.14; 239/542; 239/547; 264/149
[58] Field of Search ............... 156/244.12, 244.13, 156/244.14, 244.11, 243, 552; 239/542, 547; 264/149

[56] References Cited

U.S. PATENT DOCUMENTS

| | | | |
|---|---|---|---|
| 2,484,965 | 10/1949 | Slaughter | 264/149 |
| 2,503,518 | 4/1950 | Slaughter | 156/243 |
| 2,575,138 | 11/1951 | Slaughter | 264/149 |
| 3,981,452 | 9/1976 | Eckstein | 239/542 |
| 4,154,636 | 5/1979 | Motoyama et al. | 156/243 |
| 4,817,875 | 4/1989 | Karmeli et al. | 239/542 |
| 4,952,264 | 8/1990 | Knape | 156/552 |
| 5,022,940 | 6/1991 | Meloudar | 156/244.13 |
| 5,219,513 | 6/1993 | Addeo et al. | 156/244.14 |

*Primary Examiner*—Caleb Weston
*Attorney, Agent, or Firm*—Christie, Parker & Hale

[57] ABSTRACT

A low cost drip irrigation line is made by molding a drip emitter having an elongated labyrinthine channel formed in the depth of the emitter body. A plastic film is extruded and passed through a film die with an air injection tube at one end forming a plastic film bubble. A feed tube sequentially feeds the emitters in series through the plastic film bubble and to the nip of laminating rolls for laminating the emitter to the plastic film bubble so that opposite wall portions of the plastic film are bonded to the opposite outer faces of the emitter. This encloses the labyrinthine channel and thereby forms a sealed labyrinthine passage. Inlet and outlet openings are formed at opposite ends of the labyrinth and the film bubble, following the laminating step, is formed into an elongated flexible drip irrigation conduit with the emitter on the inside of the conduit so the inlet receives water under pressure travelling in the conduit, passes it through the labyrinthine passage, and discharges the water to the exterior of the conduit at a drip rate. The emitter body can be made from an injection-molded polymer, such as polyethylene, which can contain trifluralin, for inhibiting root growth near the emitters during use of the drip irrigation line.

9 Claims, 2 Drawing Sheets

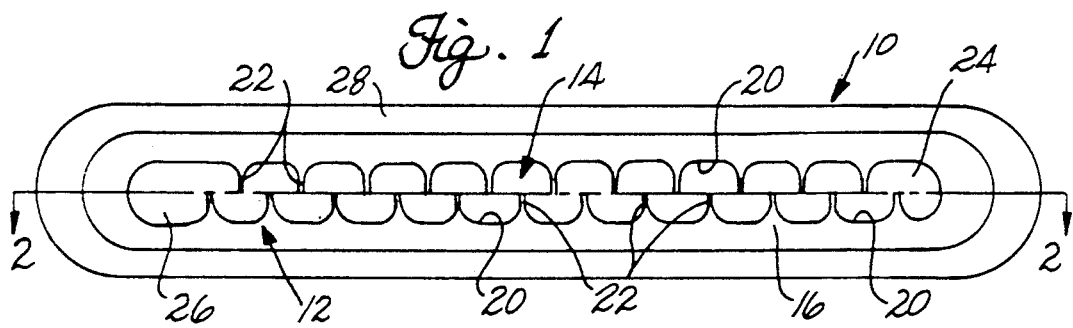
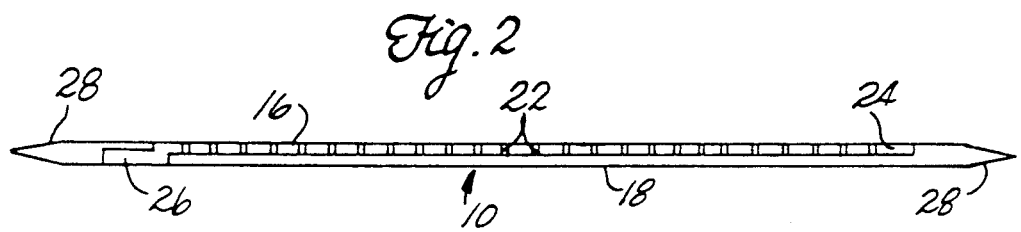
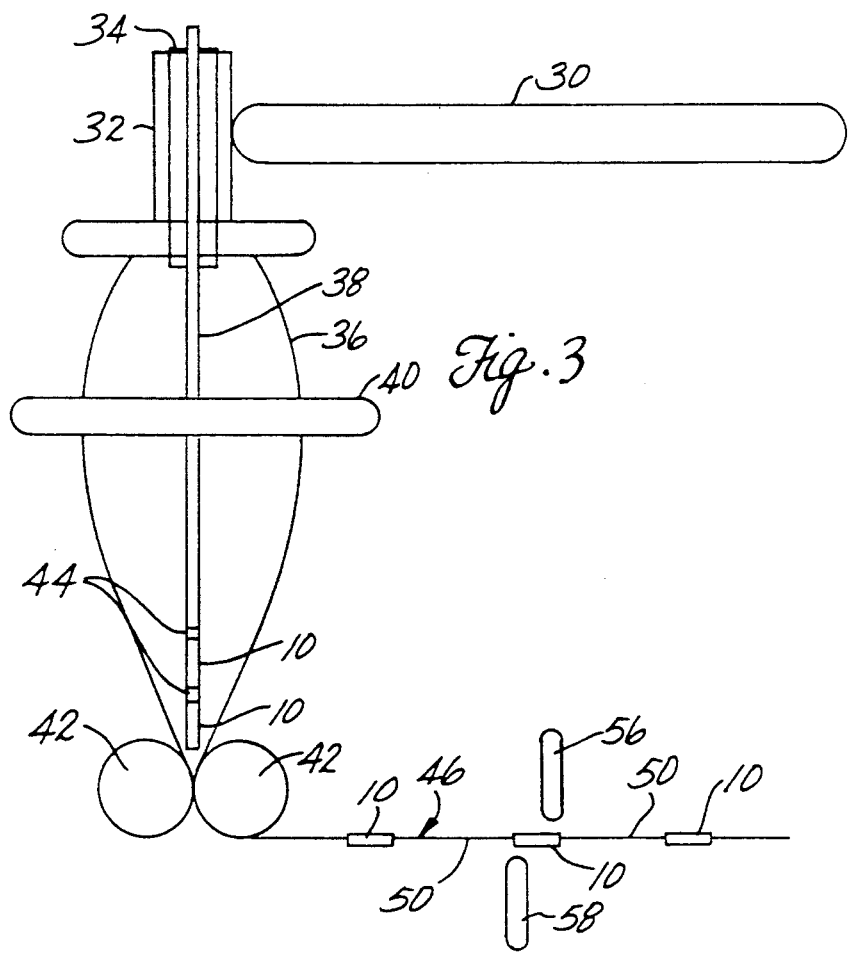

PROCESS FOR MAKING LOW COST DRIP IRRIGATION LINES USING PLASTIC EXTRUSION AND FILM BLOWING TECHNIQUES

FIELD OF THE INVENTION

This invention relates to drip irrigation and, more particularly, to a drip irrigation system in which an emitter is embedded by lamination between two plastic film sheets. The invention also relates to a method for making drip irrigation lines in which emitters are bonded to a drip irrigation supply conduit by plastic film extrusion, film blowing and lamination techniques. The invention is particularly useful in the manufacture of low cost drip irrigation lines that can be used over time for multiple crops or multiple growing seasons.

BACKGROUND OF THE INVENTION

Drip irrigation systems usually include a continuous irrigation water supply line with emitter-type drippers installed along the line, usually at regular intervals. Irrigation water flows through the supply line under pressure, and a small amount of water continuously drips out at the intervals where the drippers are located. Drip irrigation has proved to be highly successful in producing greater growth of vegetation with the same amount of water, when compared with conventional irrigation techniques.

A number of different drip irrigation systems have been used in the past. They vary from the cheapest and simplest systems, namely, a hole in the wall of a water supply line, to expensive and complex multi-component dripper units.

Perhaps the most practical of the prior drip irrigation systems involves use of separate drip emitters or drippers installed in or on the supply line. The dripper taps off a portion of the water flowing in the water supply line and passes the water through a labyrinth or other meandering or circuitous path that produces a large pressure drop in the water and discharges it at a uniform drip rate. Generally, such pressure-reducing labyrinthine drippers are successful because they use a large enough hole in the supply pipe and a wide enough passage through the labyrinth to avoid clogging in most cases, while they also operate at reasonably high line pressures.

The U.S.D.A. and other research groups have recognized that drip irrigation can provide savings benefits for water, agricultural chemicals, energy and labor; and that these benefits particularly apply to low value field crops, such as alfalfa, sugar cane, corn and cotton. Furthermore, they have shown that use of drip irrigation can result in a meaningful reduction in the pollution of aquifers by salts and agricultural chemicals.

The present invention is directed to the problem of developing an economic drip irrigation system for low value crops where it is essential to reduce the capital costs for a precise system to a level lower than that achieved by drip irrigation systems presently available.

There are low cost drip irrigation systems made from thin plastic film, as thin as 0.004 inch in wall thickness. These products are not easy to use because of the low strength of the film, and they are used for one growing season only and then thrown away. There are similar drip irrigation systems with wall thicknesses up to about 0.02 inch, and if buried, they will last for many crops, but these systems have problems with root intrusion. In addition, the management to operate these systems for several crops is very difficult, and thus excludes most growers. Drip irrigation systems presently on the market also do not effectively combine with the technology to use herbicides, such as trifluralin, to keep roots out of drip systems. U.S. Pat. No. 5,116,414 to Burton et al. describes a method for preventing roots of plants from intruding into a zone of soil below the surface of the soil without killing the plants. The patent describes a method for incorporating the herbicide trifluralin into a polymer to form a controlled release of trifluralin, which is EPA-registered for this application. Because of the low vapor pressure of trifluralin and its resultant volatility, it is very difficult to extrusion mold drip irrigation products containing trifluralin, because the heat of extrusion dissipates the trifluralin. Furthermore, due to the high cost of trifluralin, it is essential in its application to drip irrigation to maintain the trifluralin in the area to be protected, i.e., the exit holes from the drip system. For instance, it can be prohibitively expensive to uniformly disperse trifluralin in the wall of a drip irrigation conduit for the length of the supply line. There are heavy walled products with a wall thickness of 0.045 inch, for example, such as taught by Ruskin in U.S. Pat. No. 5,052,625, which are combined with trifluralin. However, these products are much too expensive for low value field crops.

Hence, there is a need for a low cost drip irrigation system having low manufacturing costs, including the costs of materials, capital and labor, and high production speeds. There is also a need for a low cost dripper system suitable to carry trifluralin so that it is effective during use, and so that the end product will deliver precise amounts at each orifice. Such low cost dripper systems should be resistant to clogging by impurities in the water. There is also a need for a low cost drip irrigation system that will have an extended life beyond the growing season of one crop and can, in fact, be used for multiple growing seasons or multiple crops in sequence over an extended period of time, while the trifluralin also remains effective over such an extended period of time.

SUMMARY OF THE INVENTION

The present invention provides a drip irrigation system and a method for making low cost drip irrigation lines which meet the objectives described above, and therefore, can open up large new markets for drip irrigation.

Briefly, one embodiment of the invention includes embedding a drip emitter in a wall of a drip irrigation conduit by lamination techniques. The emitter can be any type of drip irrigation emitter. In one form of the invention, the emitter body is made by injection molding techniques and may include a dispersed herbicide, such as trifluralin. The emitter is preferably embedded by lamination between two overlying plastic film sheets which are laminated film-to-film except where the emitter is embedded between the films and laminated on its opposite sides to the films. In one embodiment, the process includes forming a plastic film bubble having a thin outer film of plastic enclosing a hollow interior of the bubble. The emitter is inserted into the bubble, followed by laminating the emitter body to the plastic film bubble under pressure, so that wall portions of the plastic film forming the bubble are bonded to the opposite outer faces of the emitter. In one form of the invention, emitters are fed to the nip of a pair of pressure rolls in sequence, while the opposite faces of the film bubble also are fed to the nip of the pressure rolls to wedge the emitter between the faces of the film layers. The sequentially fed emitters are thus laminated under pressure with the heat of extrusion to bond the emitters between the opposite faces of the plastic film sheets. After the laminating step, an inlet is formed in one side of a pressure-reducing passage through the emitter and an outlet is formed in another side of the passage. The laminated films between embedded emitters are formed into an elongated, flexible drip irrigation conduit, with the emitter inside the walls of the conduit, and with the emitter inlet on the inside of the conduit so the inlet receives water under pressure travelling in the conduit, passes it through the passage to reduce its pressure, and discharges the water through the outlet to the exterior of the conduit at a drip rate.

The invention can make use of injection molded dripper units which contain herbicides such as trifluralin uniformly dispersed throughout the emitter unit without the heat of the process for making the emitter dissipating the trifluralin and rendering it ineffective during use. This results in localizing the trifluralin to only the drip emitters embedded in the line, particularly the orifice areas of the line, which reduces cost and effectively uses the herbicide. Further, by extruding the film using conventional film-blowing equipment and laminating techniques, optimal strength of the film can be achieved, which can extend the life of the drip irrigation lines during use, to multiple crops and multiple growing seasons. The dispersed trifluralin in the emitter prevents intrusion of roots in the dripper areas over the extended life of the dripper system.

These and other aspects of the invention will be more fully understood by referring to the following detailed description and the accompanying drawings.

DETAILED DESCRIPTION OF THE DRAWINGS

FIG. 1 is an elevation view showing a molded plastic dripper unit used in the process of this invention.

FIG. 2 is a cross-section taken on line 2—2 of FIG. 1.

FIG. 3 is a schematic view illustrating an extrusion and laminating process for bonding the dripper between extruded film layers.

DETAILED DESCRIPTION

Figure 4:
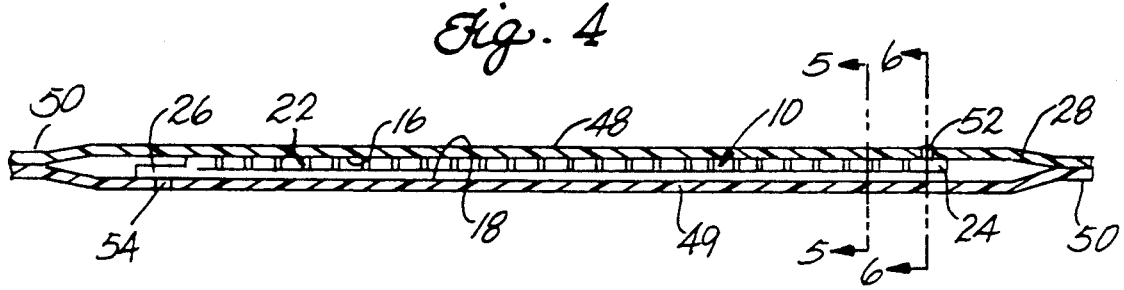
FIG. 4 is a cross-sectional view showing the dripper inserted into the film with holes punched for inlet and outlet openings.

FIGS. 1 and 2 illustrate one embodiment of a drip irrigation emitter 10 that can be used in the process of this invention. The emitter 10 is described below as one example of the many types of emitters that can be used in the drip irrigation system of this invention. The emitter 10 is a molded plastic emitter of the turbulent flow variety which is preferably manufactured by injection molding techniques. Other types of emitters which can also be used with the invention are pressure-compensating emitters and vortex type emitters, for example. The emitter 10, also referred to herein as a dripper, has a molded plastic body 12, and a flow-restricting labyrinthine channel 14 molded into the depth of a first flat face 16 of the dripper body. The dripper body is long and narrow, as shown in FIG. 2, and has a flat second face 18 extending parallel to and opposing the first flat face 16. The labyrinthine channel 14 thus faces toward the first face and away from the second face of the emitter. The labyrinthine channel extends along the center line of the dripper body, parallel to the long dimension of the dripper. The channel has opposed side walls 20 spaced apart narrowly and parallel to one another, with elongated uniformly spaced apart ribs or baffles 22 that extend into the channel from both of the side walls of the channel outer boundary. The ribs are interleaved along the length of the channel in the well-known fashion and are generally parallel to one another and generally perpendicular to the long side boundaries of the channel. The ribs thus form a continuous meandering or labyrinthine channel that constantly reverses the direction from one end of the channel to the other. The tops of the ribs re continuous with the elevation of the flat face 16 that spans the molded dripper body. An inlet region 24 is formed as a recess at one end of the labyrinthine channel, and an enlarged outlet region 26 is formed as a recess at the opposite end of the channel. The outlet region 26 extends through the entire depth of the molded emitter unit to communicate with an outlet opening described below. The molded dripper unit also has a tapered outer peripheral edge region 28 that extends continuously around the outer perimeter of the dripper unit.

In one embodiment, the dripper has a length of about 1.2 inch, a thickness of about 0.037 inch, and a width of about 0.27 inch.

The dripper is preferably injection molded from polyethylene, or from a polymer containing a principal amount of polyethylene, or other low cost moldable polymer. The herbicide trifluralin is dispersed uniformly throughout the resin, and techniques for dispersing the herbicide in the resin are described in more detail in U.S. Pat. No. 5,116,414 to Burton, which is incorporated herein by this reference. Trifluralin is a volatile material and is not suitable for use in extruded dripper components where the heat of extrusion can evolve the herbicide during the extrusion process. By making the dripper units 10 by injecting molding a polymer containing the trifluralin uniformly dispersed in it, the pressure in the injection mold and the temperature reduction brought about by the walls of the mold itself can prevent dissipation and ensure the trifluralin being present at an effective level within the finished dripper unit. A reasonably low cost injection mold can produce approximately 64 parts every 10 seconds. The injection-molding machine can be completely automated and requires minimal operating labor.

FIG. 3 illustrates one embodiment of an extrusion and laminating process for embedding the dripper units 10 in the wall of a plastic film conduit. The processing step includes an extruder 30 for forming a thin sheet of extruded plastic around an extruder die 32. An air feed tube 34 extends through the extruder die, and conventional film-blowing techniques are used for extruding the film downwards and forming an extruded plastic film bubble 36 below the die. A long, narrow dripper feed tube 38 contains a supply of the molded dripper units 10 extending lengthwise and in series through the tube 38. An air cooling ring 40 extends around the outer circumference of the extruded plastic bubble 36, and the dripper feed tube extends through the center of the bubble and terminates a short distance above a pair of rubber laminating rolls 42. Time-sequenced electrically-operated release pins 44, located above the laminating rolls, control the timed sequence of feeding each dripper 10 in series to the nip of the pressure rolls 42, along with opposite sides of the plastic film bubble, which also pass between the nip of the rolls. In one embodiment, the extruded plastic film bubble is expanded to a circumference of about two inches, i.e., about 0.637 inch in outside diameter. This technique of blowing the film and laminating the layers produces the optimal strength of film by weight. This is because a balanced orientation of the film is obtained by the blow up ratio across the width versus the speed of draw-down in length. Also, two laminated layers of film are stronger than a single layer because any fisheyes, or other weak areas of film are extremely unlikely to occur opposite one another. The drippers are fed through the center of the die and the nip of the laminating rollers, while the inside surface of the film is still hot, in order to wedge the drippers securely between the two layers of film, using the heat of extrusion in the process of bonding the extruded film layers to opposite faces of the drippers. The rubber laminating rolls compress to allow the dripper to pass between them. The air cooling ring 40 cools the outside of the film and stabilizes the bubble when extruding heavy wall thicknesses, but it can be omitted in some production operations. The distance between the nip and the die is adjustable and can be short, on the order of 12 inches. The drippers drop into the nip between the rolls 42 by gravity and are sequentially released down the dripper feed tube by the release pins 44. Following the lamination step at the nip of the pressure rollers 42, a continuous length 46 of two overlying and bonded film layers travel away from the laminating station. The emitters 10 are bonded between the overlying film layers.

FIG. 4 illustrates the cross-sectional construction of the extruded and laminated dripper units 10 between opposite film layers 48 and 49, in which the first face 16 of each dripper is sealed to the plastic film layer 48 so as to form a sealed labyrinthine dripper passage through the length of the dripper unit. The film 48 is bonded to the first face 16 of the emitter along with the tops of the ribs 22 to form a completely sealed labyrinthine passage, which causes water entering one end and to travel in a meandering or circuitous path at a reduced drip rate. Film layer 49 is bonded to the opposite face 18 of each dripper. FIG. 3 also illustrates the two layers 48 and 49 of the extruded film being bonded to one another at the regions 50 of the continuous film formed between the spaced-apart sealed dripper units 10.

Figure 5:
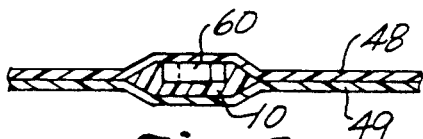
FIG. 5 is a cross-section taken on line 5—5 of FIG. 4.
Figure 6:
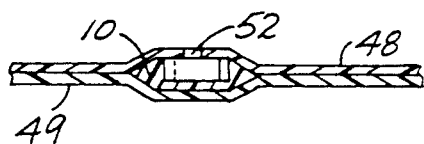
FIG. 6 is a cross-section taken on line 6—6 of FIG. 4.

Referring again to FIG. 3, following the laminating step in which the dripper is now formed inside the outer film layers 48 and 49, holes are punched from the outside to form an inlet passage 52 and an outlet passage 54 at opposite ends of each dripper unit. The inlet passage 52 is formed through the film layer 48 and into the inlet region 24 of the labyrinthine channel, and at the opposite end of the dripper, the outlet passage 54 is formed through the film layer 49 and into the outlet region 26 of the labyrinthine channel. Preferably, laser drilling is used, although mechanical punching or drilling also can be used. FIG. 3 illustrates laser hole punches 56 and 58 on opposite sides of the continuous film for forming the inlet and outlet passages. A solid section of plastic is located immediately opposite where the hole is punched so there is no risk of punching through both layers of film, as shown in FIG. 6. FIG. 5 is a cross-section showing a flow path region 16 through the sealed labyrinthine channel formed in the finished dripper.

Figure 7:
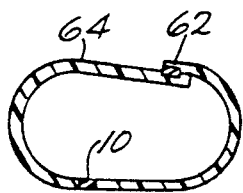
FIG. 7 is a semi-schematic cross-sectional view showing a completed drip irrigation conduit containing the extruded and laminated dripper unit.

As shown in FIG. 7, in line with the film extrusion process, the film is rolled over a mandrel of about 0.60 inch in diameter to produce and overlap of about 0.125 inch along the length of the film. A hot bead seal 62 is extruded into the overlap to form a continuous extrusion bead seal along the length of the conduit 64 formed by the tube wrapping and welding step. The resulting conduit is then pressed flat and rolled up.

The resulting process can be run at high speeds, and it is estimated that three dippers per second can be inserted into the tube. Three dippers per second at a spacing of about 12 inches between drippers produced at a production line speed of 180 feet per minute, or between 50 to 70 million feet per annum, produces a simple low cost process. This assumes a weight of production of 108 lbs. per hour from the film extruder. A small 1½ inch extruder can handle such output.

The film extrusion technique can use the same linear low density grades of resins used for heavy duty polyethylene bags. These resins are manufactured in very large quantities and sold at reasonably low prices. Although this is the preferred resin, any polyolefin or combination of polyolefins may be used.

The injection-molded turbulent flow emitter is well proven in the field to be the most accurate dripper with the least tendency of blocking. One variation of this is disclosed in U.S. Pat. No. 4,215,822 to Mehoudar and products of this type have been in the market since 1975 and they perform extremely reliably.

Therefore, the drip irrigation product and techniques of this invention meet the objectives of producing a low cost dripper that can be used for multiple crops and/or multiple growing seasons, while carrying a necessary level of herbicide in order to be resistant to root intrusion and delivering precise amounts of water at each orifice, and also while being resistant to clogging by impurities in the water.

What is claimed is:

1. A process for making drip irrigation lines comprising:

providing a drip emitter having an emitter body and a drip irrigation passage in the emitter for producing a pressure-reduction in water traveling in the passage, forming a plastic film bubble having a thin outer film of plastic enclosing a hollow interior of the bubble, inserting the emitter body into the hollow interior of the bubble so the drip irrigation passage faces toward a wall portion of said plastic film bubble, applying pressure to opposite wall portions of the plastic film bubble for laminating the emitter body to the plastic film bubble so that said opposite wall portions of the plastic film forming the bubble are bonded to opposite sides of the emitter body and to thereby form an intermediate carrier sheet comprising an elongated, thin, flexible plastic film sheet in generally planar form with spaced-apart outer marginal edges and having the laminated emitter body embedded in said plastic film sheet inboard from said outer marginal edges, forming an inlet to and an outlet from spaced-apart regions of the emitter passage, and forming the intermediate carrier sheet into an elongated, flexible tubular drip irrigation conduit, with the emitter embedded in a wall of the conduit so the inlet receives water under pressure traveling in the conduit, passes it through the drip irrigation passage in the emitter, and discharges the water through the outlet to the exterior of the conduit at a drip rate.

2. The process according to claim 1 in which the emitter body is injection molded and the injection molding compound includes a uniformly dispersed herbicide.

3. The process according to claim 2 in which the injection molded material contains polyethylene.

4. The process according to claim 3 in which the herbicide contains trifluralin.

5. A process for making drip irrigation lines comprising:

forming a drip emitter from injection molding techniques, the drip emitter having an emitter body and an elongated labyrinthine channel formed in the depth of the emitter body and facing toward an outer face of the emitter body, providing an extrusion die and an air feed tube and extruding a plastic film through the die with the air feed tube forming a plastic film bubble having a thin outer film of plastic enclosing a hollow interior of the bubble, providing a dripper feed tube extending through the hollow interior of the plastic film bubble for injecting the emitter body into the interior of the bubble so the outer face of the emitter body faces toward an outer wall of the plastic film bubble, providing a pair of pressure rolls and feeding the opposite sides of the plastic film bubble and the emitter body injected from the air feed tube to the nip of the pressure rolls for applying pressure to opposite wall portions of the plastic film bubble for laminating the emitter body to the opposite sides of the plastic film bubble so that a wall portion of the plastic film forming the bubble is bonded to the outer face of the labyrinthine body to enclose the labyrinthine channel and thereby form a sealed, pressure-reducing labyrinthine passage between the emitter body and the bonded wall portion of the film, thereby forming an intermediate carrier sheet comprising an elongated, thin, flexible plastic film sheet of generally planar form with spaced-apart outer marginal edges and having the laminated emitter body embedded in said plastic film sheet inboard from said outer marginal edges, forming an inlet to an outlet from spaced-apart regions of the labyrinthine passage, and forming an extrusion bead seal along said opposite marginal edges of the intermediate carrier sheet downstream from the pressure rolls to form the intermediate carrier sheet into an elongated, flexible, tubular drip irrigation conduit, with the emitter embedded in a wall of the conduit, so that the inlet receives water under pressure traveling in the conduit, passes it through the labyrinthine passage to reduce its pressure, and discharges the water to the exterior of the conduit at a drip rate.

6. The process according to claim 5 in which the drip emitter is made from polyethylene.

7. The process according to claim 6 in which the polyethylene dripper has an herbicide dispersed in it.

8. The process according to claim 7 in which the herbicide is trifluralin.

9. A process for making drip irrigation lines, comprising:

providing an emitter body having a pressure-reducing passage extending through it, the emitter body having opposite first and second faces;

placing the emitter body between first and second sheets of flexible plastic film that overlie one another face-to-face;

laminating the first and second sheets of film to the first and second faces of the emitter body to seal the emitter body inside the sheets of plastic film;

laminating the overlying faces of the first and second film sheets to each other in regions thereof extending away from the sealed emitter body to thereby form said laminated first and second film sheets as a thin, flexible intermediate carrier sheet in generally planar form with spaced-apart outer marginal edges and having the laminated emitter body embedded in said carrier sheet inboard from said outer marginal edges;

bonding said outer marginal edges of the intermediate carrier sheet to form an elongated continuous flexible tubular conduit having the emitter embedded in a wall of the conduit; and forming an inlet from the conduit to the passage in the emitter and forming an outlet from the emitter passage to the exterior of the conduit so that water traveling in the conduit can pass through the pressure-reducing passage in the emitter and discharge to the exterior of the conduit at a drip rate.

* * * * *